(12) United States Patent
Wallace

(10) Patent No.: US 6,457,924 B1
(45) Date of Patent: Oct. 1, 2002

(54) SNAP-IN FASTENER

(75) Inventor: Robert Bruce Wallace, Mebane, NC (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 09/583,830

(22) Filed: May 31, 2000

(51) Int. Cl.[7] .............................................. F16B 39/284
(52) U.S. Cl. .................. 411/112; 174/58; 411/900; 411/182; 411/508
(58) Field of Search ................... 174/48, 50, 58; 220/4.02, 3.8; 24/293, 289, 295; 411/900, 904, 909, 508, 509, 913, 182, 111, 112, 113

(56) References Cited

U.S. PATENT DOCUMENTS

| | | | | |
|---|---|---|---|---|
| 3,869,760 A | * | 3/1975 | Meyer ............................ | 24/73 |
| 5,314,280 A | * | 5/1994 | Gagliardi et al. ............ | 411/182 |
| 5,873,690 A | * | 2/1999 | Danby et al. ............ | 411/508 X |
| 5,887,319 A | * | 3/1999 | Smith ............................ | 24/293 |
| 5,939,671 A | * | 8/1999 | Gretz ............................ | 174/50 |
| 6,283,689 B1 | * | 9/2001 | Roytberg et al. ........ | 411/508 X |
| 6,283,690 B1 | * | 9/2001 | Belter ........................ | 174/50 X |

OTHER PUBLICATIONS

Chart of fasteners; penn engineering & manufacturing corp.; 1991.

* cited by examiner

Primary Examiner—Dean A. Reichard
Assistant Examiner—Dhiru R. Patel
(74) Attorney, Agent, or Firm—Cantor Colburn LLP

(57) ABSTRACT

A fastener designed to press into two slots of a barrier and become captivated with spring tension barbs is disclosed. The fastener thus allows two vertical barriers to be fastened together by driving a screw through a first barrier, a second barrier, and then the fastener, to compress the barriers in place during assembly. The fastener may be provided with a nut holding cage with caged nut or a pair of thread engaging flanges to secure the screw to the fastener.

23 Claims, 10 Drawing Sheets

SNAP-IN FASTENER

BACKGROUND OF THE INVENTION

The present invention relates to fasteners and more particularly relates to a fastener for attaching to a barrier.

Motor control sections are designed with horizontal and vertical bus bar assemblies. The bus carries electrical current to plug-in units that operate motors in factories. The bus bar is energized during operation, requiring isolation of electrical current to prevent inadvertent contact. This may be accomplished by using two bus barriers. The barriers usually have internal grooves to hold each bus in position and keep them spaced properly to prevent short-circuiting.

Connections between adjacent vertical barriers of the prior art have previously typically been assembled vertically and required two assemblers to install nut and bolt type hardware. This method subsequently increases the labor cost of the assembly. Occasionally, inserts have been molded into an insulation barrier. Sometimes fasteners, such as PEM® brand self-clinching fasteners by Penn Engineering & Manufacturing Corp., have been employed. Unfortunately, both of these additions have resulted in significantly increasing the part cost of the assembly. In yet another attempt to secure two vertical barriers, a fixture, not forming part of the assembly, has been employed to secure a nut to one barrier using self taping screws. Again, this method imparts substantial part cost and labor cost to the final assembly.

SUMMARY OF THE INVENTION

In an exemplary embodiment of the present invention, a fastener, for securing to a vertical barrier and allowing an adjacent barrier to be secured thereto, includes a main body portion having a first end and a second end, a first leg depending from the first end of the main body portion, and a second leg depending from the second end of the main body portion. The first leg and the second leg each having a mating end adjacent the main body portion and an unattached free end. The fastener further includes a first barb on the first leg and a second barb on the second leg. The first barb and the the second barb are each formed as a cutout portion having an attached end adjacent the free end of each respective leg and angled outwardly from each respective leg.

BRIEF DESCRIPTION OF THE DRAWINGS

FIG. 10 is a perspective view of a pair of vertical bus barriers for holding vertical bus bars there between;

DETAILED DESCRIPTION OF THE PREFERRED EMBODIMENT

Figure 1:
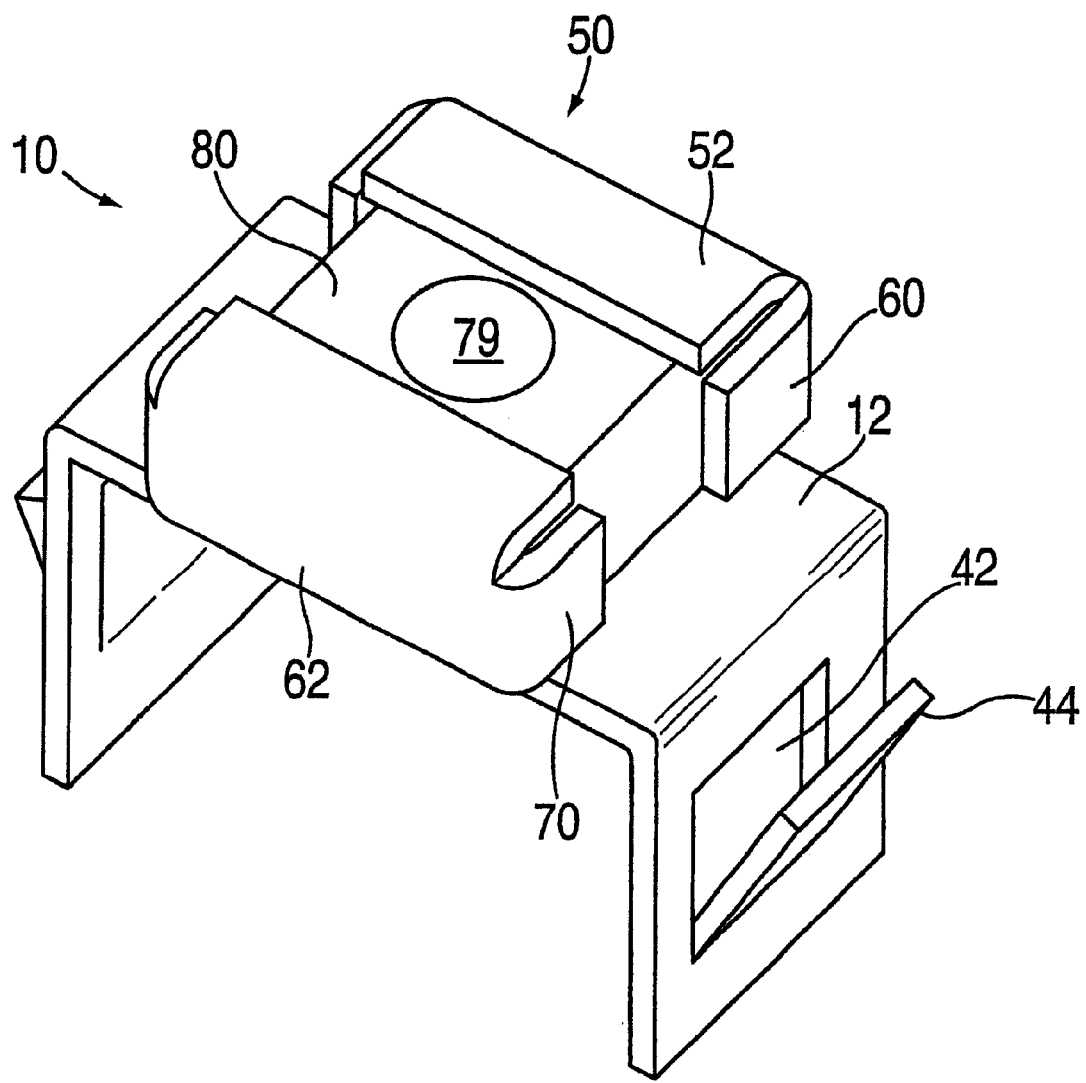
FIG. 1 is a top perspective view of a fastener and caged nut according to the present invention.
Figure 2:
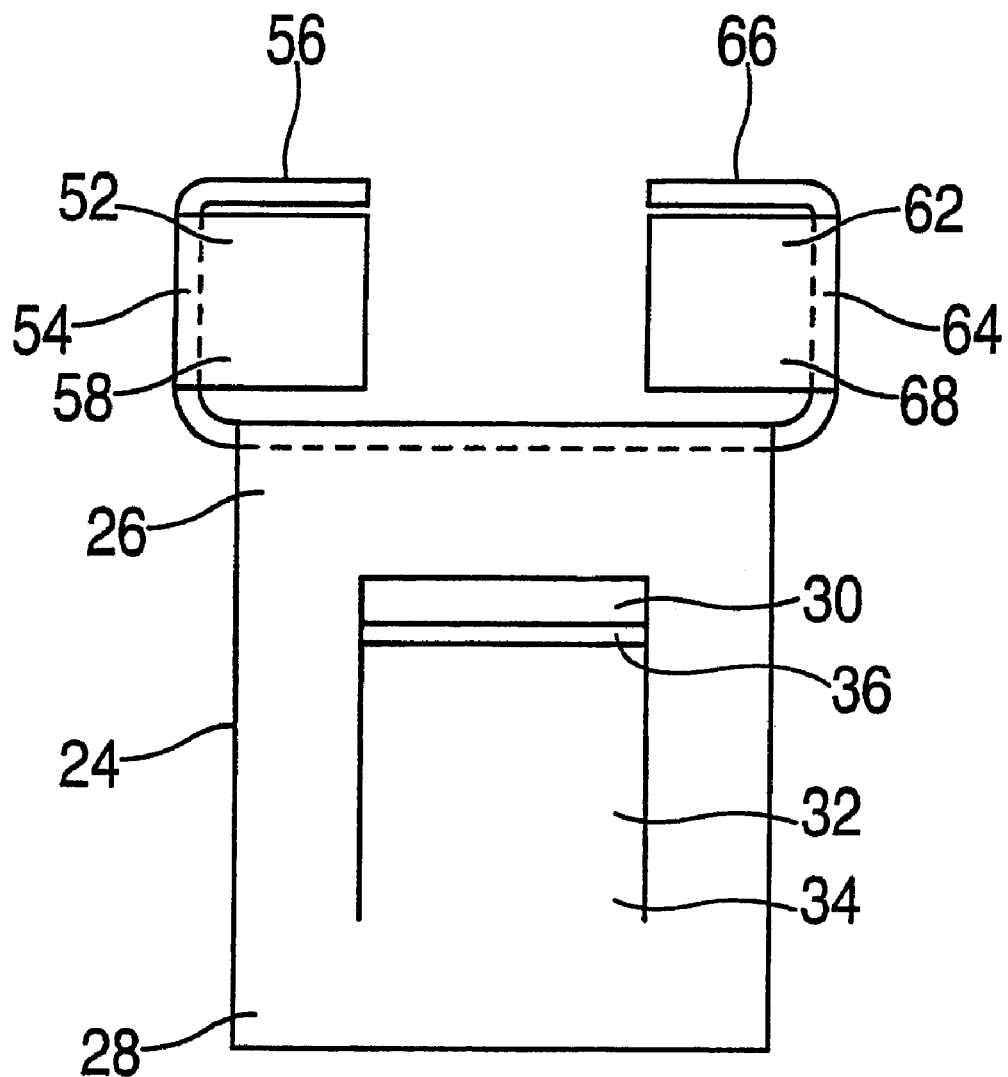
FIG. 2 is a top plan view of the fastener of FIG. 1.
Figure 3:
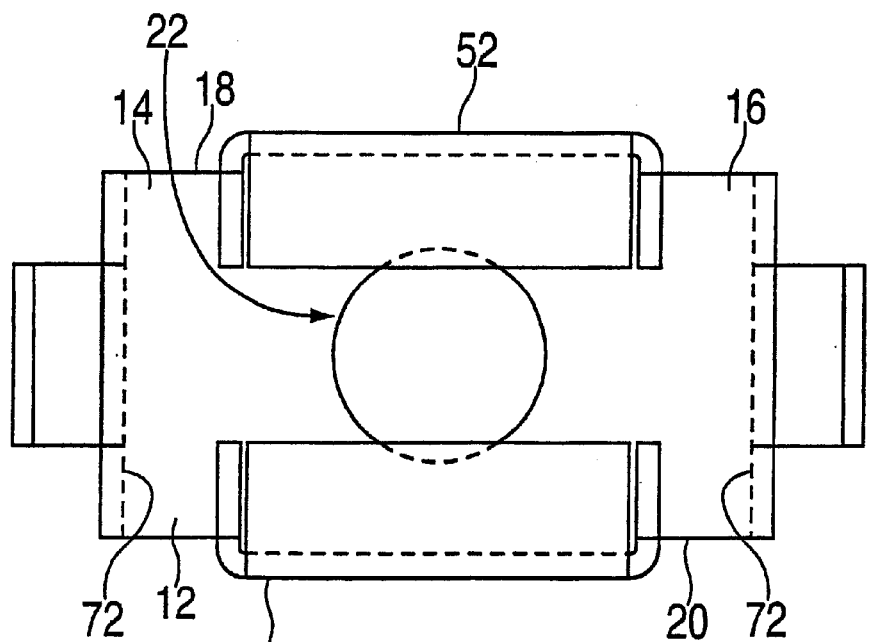
FIG. 3 is a front plan view of the fastener of FIG. 1.
Figure 4:
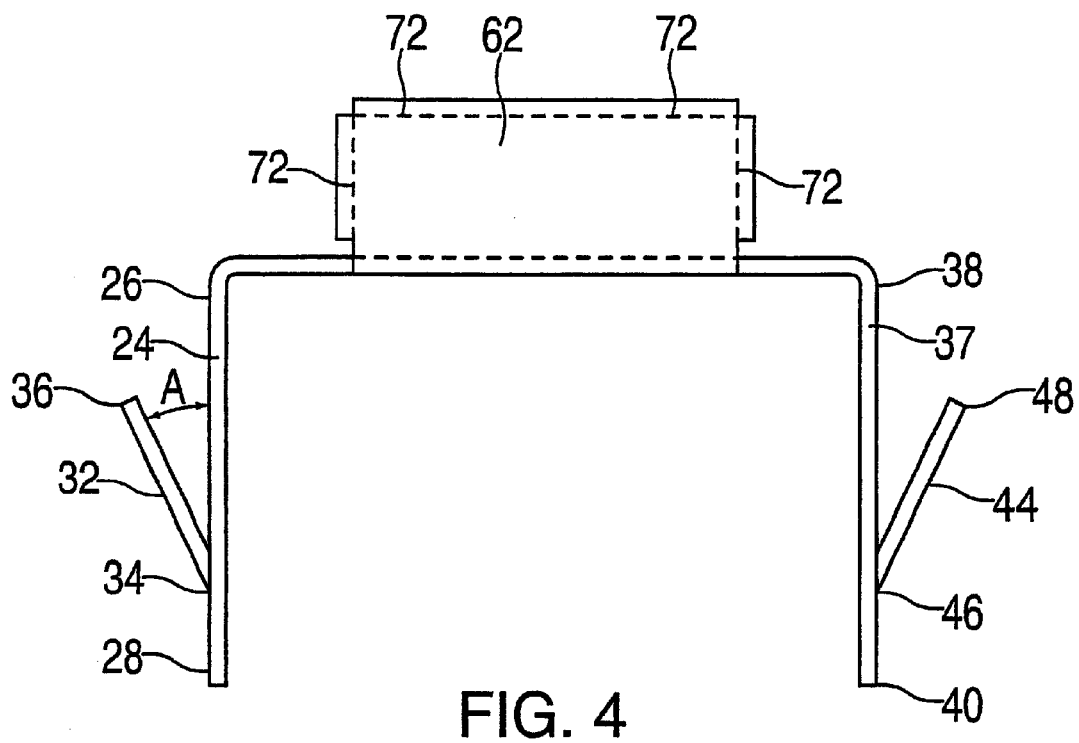
FIG. 4 is a side plan view of the fastener of FIG. 1.

As shown in FIGS. 1–4, a fastener 10 according to the present invention generally includes a main body portion 12, a first leg 24 having a barb 32, a second leg 37 having a barb 44, and a nut holding cage 50.

More specifically, the main body portion 12 may have a generally rectangular shape having a first end 14, a second end 16, a first side 18, and a second side 20. Centrally located within the main body portion 12 is a circular aperture 22.

Depending from the first end 14 of the main body portion 12 is the first leg 24. The first leg 24 may also have a generally rectangular shape with a mating end 26 which is adjacent the first end 14 of the main body portion 12. Opposite the mating end 26 is a free end 28. Within the first leg 24 is a cutout opening 30. The material from the cutout 30 makes up a barb 32 which extends outwardly at an angle A from the first leg 24. The barb 32 extends from the first leg 24 at its attached end 34. The barb 32 ends at its projecting end 36. The barb 32 is preferably spring biased with respect to the first leg 24 at an angle in the range of 5 to 45 degrees, and preferably about 25 degrees.

Depending from the second end 16 of the main body portion 12 is the second leg 37. The second leg 37, similar to the first leg 24, may also have a generally rectangular shape with a mating end 38 which is adjacent the second end 16 of the main body portion 12. Opposite the mating end 38 is a free end 40. Within the second leg 37 is a cutout opening 42. The material from the cutout 42 makes up a barb 44 which extends outwardly at an angle A from the second leg 37. The barb 44 extends from the second leg 37 at its attached end 46. The barb 44 ends at its projecting end 48. The barb 44 is preferably spring biased with respect to the second leg 37 at an angle in the range of 5 to 45 degrees, and preferably about 25 degrees.

The nut holding cage 50 preferably includes a first holding arm 52 and a second holding arm 62 for securing a nut, e.g. nut 80, therein. The cage 50 is preferably designed such that the screw hole 79 of the nut 80 is aligned with the screw accepting aperture 22 of the main body portion 12. The first holding arm 52 may include a side member 54 extending from the first side 18 of the main body portion 12. Two side flanges 58 and 60 and a top flange 56 preferably extend from the side member 54 to complete the first holding arm 52. The second holding arm 62 may include a side member 64 extending from the second side 20 of the main body portion 12. Two side flanges 68 and 70 and a top flange 66 preferably extend from the side member 64 to complete the second holding arm 62.

Advantageously, the fastener 10 may be stamped from a single sheet of material and bent along bend lines 72 to form the present invention. Preferably, the first leg 24, second leg 37, side member 54, and side member 64 may be bent along bend lines 72 at an approximate 90 degree angle from the main body portion 12. Additionally, for the first and second holding arms 52, 62, the side and top flanges 56, 58, 60, 66, 68, and 70 may be bent along bend lines 72 at approximate 90 degree angles from their respective side members 54 and 64. The barbs 32 and 44 may also be bent along bend lines 72 at the above described angle A from first and second legs 24 and 37. The sheet of material may be spring steel and heat treated to form the fastener 10 of the present invention.

Figure 5:
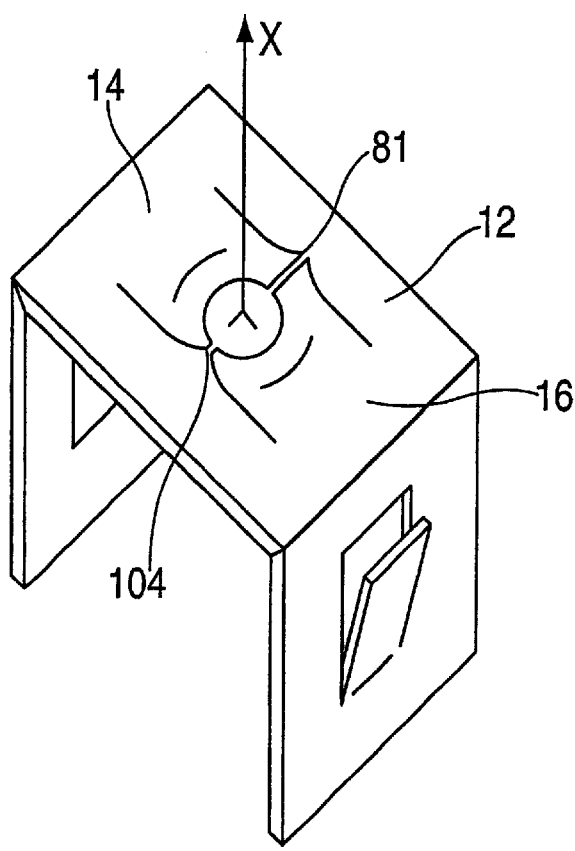
FIG. 5 is a top perspective view of a fastener having thread engaging flanges according to the present invention.
Figure 6:
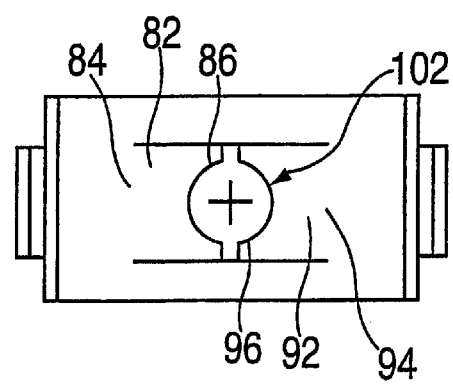
FIG. 6 is a top plan view of the fastener of FIG. 5.
Figure 7:
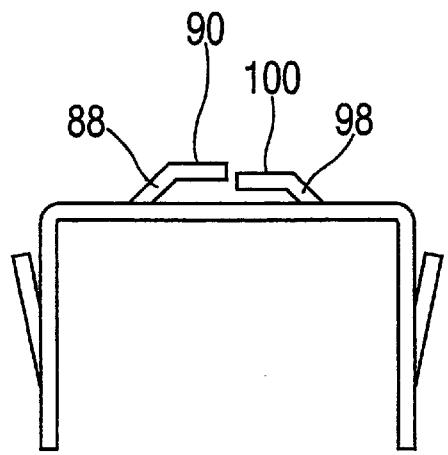
FIG. 7 is a side plan view of the fastener of FIG. 5.

Turning now to FIGS. 5–7, the nut holding cage 50 is shown replaced by a screw retaining member 81 having a pair of thread engaging flanges. A first thread engaging flange 82 has a connected end 84 which extends from near the first end 14 of the main body portion 12 to an indented end 86 which is adapted for engaging with threads in a screw. A first section 88 extends from the connected end 84 at an angle B from the main body portion 12. A second section 90 extends from the first section 88, ending at the indented end 86, and may be generally parallel to the main body portion 12. Similarly, the second thread engaging flange 92 has a connected end 94 which extends from near the second end 16 of the main body portion 12 to an indented end 96 which is adapted for engaging with threads in a screw. A first section 98 extends from the connected end 94 at an angle B from the main body portion 12. A second section 100 extends from the first section 98, ending at the indented end 96, and may be generally parallel to the main body portion 12. The indented ends 86, 96 together form a generally circular aperture 102 for accepting a screw body in the direction indicated by arrow X. While the first thread engaging flange 82 may be the same size as the second thread engaging flange 92, the second section 100 of the second thread engaging flange 92 may be larger than the second section 90 of the first thread engaging flange 82 and the first section 98 of the second thread engaging flange 92 may be smaller than the first section 88 of the first thread engaging flange 82 such that the first thread engaging flange 82 and the second thread engaging flange 92 engage threads of a screw at different heights along the screw body. The first and second thread engaging flanges 82, 92 may be cutout from the main body portion such that a cutout opening 104 is formed in the main body portion 12 and the flanges 82, 92 may bend along bend lines 72 as previously described.

Figure 8:
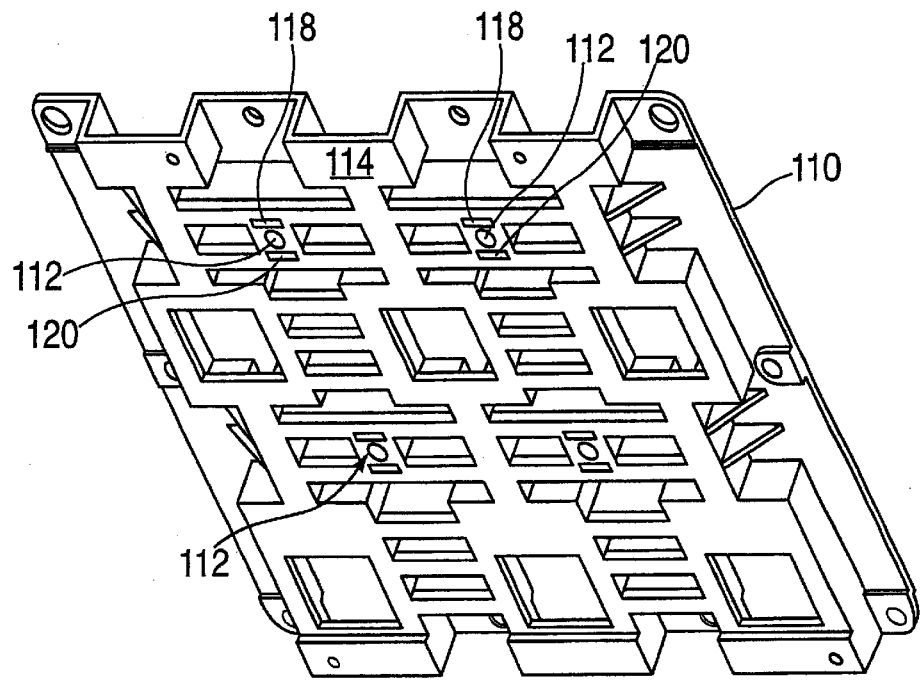
FIG. 8 is a perspective view of a vertical bus barrier according to the present invention.
Figure 9:
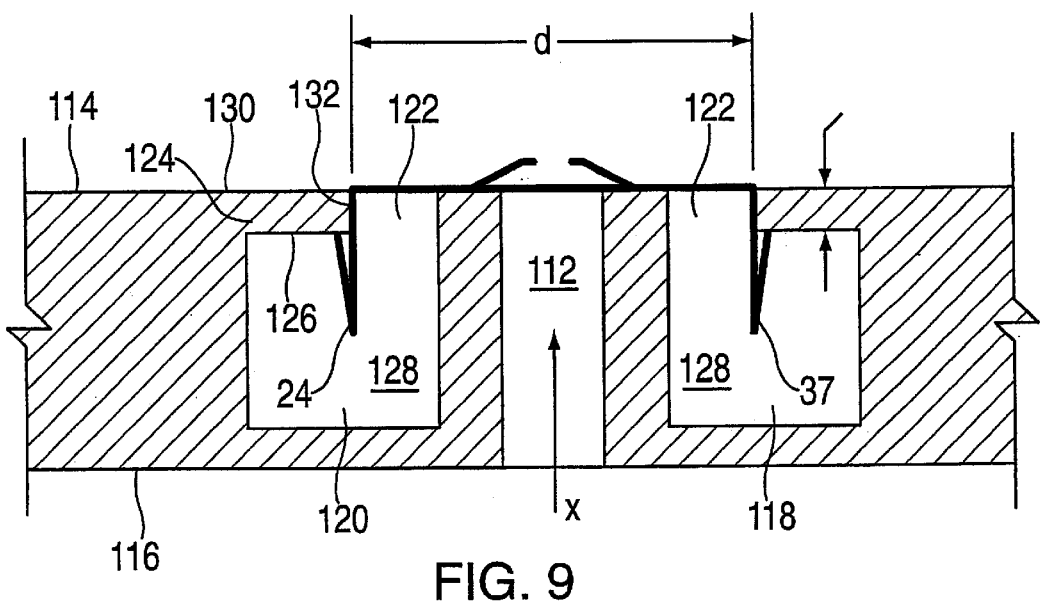
FIG. 9 is a partial side cross-sectional view of the fastener of FIG. 5 inserted within the vertical bus barrier of FIG. 8.

FIGS. 8–11 show vertical bus barriers for accepting the fastener 10 of the present invention. The barriers 110 and 111 are termed "vertical bus barriers" because they sandwich vertical bus bars there between, as will be described. A first vertical bus barrier 110 is shown in FIG. 8. A second vertical bus barrier 111 is preferably a duplicate of first vertical bus barrier 110, and therefore only the details of first vertical bus barrier 110 will be described. The assembly of second vertical bus barrier 111 to first vertical bus barrier 110 will be described below. The first vertical bus barrier 110 has a series of screw holes 112 passing through a first surface 114 and a second surface 116 of the vertical bus barrier 110. The screw holes 112, four in FIG. 8, are flanked by a pair of rectangular slots 118, 120. Each slot 118, 120 has an opening 122 for accepting either the first leg 24 or the second leg 37 of the fastener 10. Each slot 118, 120 further has an upper wall 124 with an inner wall surface 126 within the interior 128 of the slots 118, 120, an outer wall surface 130 contiguous with the first surface 114 of the vertical bus barrier 110, and an interior side wall surface 132 connecting the inner wall surface 126 and the outer wall surface 130. Preferably, the distance d from the interior side wall surface 132 of a first slot 118 to the interior side wall surface 132 of a second slot 120 is substantially equal to (or slightly greater than) the length 1 of the main body portion 12 such that a fastener 10 may fit snugly within the slots 118, 120.

When a fastener 10 is inserted into the slots 118, 120 by pushing the first and second legs 24, 37 into the slots 118, 120, the barbs 32, 44 are compressed towards the first and second legs 24, 37. That is, the angle A is reduced when the barbs 32, 44 slide along the interior side wall surface 132 from their attached ends 34, 46 to their projecting ends 36, 48. Once the projecting ends 36, 48 are pushed past the interior side wall surface 132 of the slots 118, 120, the barbs 32, 44 return to their biased position forming the angle A with respect to the first and second legs 24, 37. In this biased position, the projecting ends 36, 48 abut against the inner wall surface 126 of the slots 118, 120 such that the fastener 10 cannot be removed, without significant force and effort, from the vertical bus barrier 110. Thus, the fastener 10 is simply snapped into place.

Figure 10:
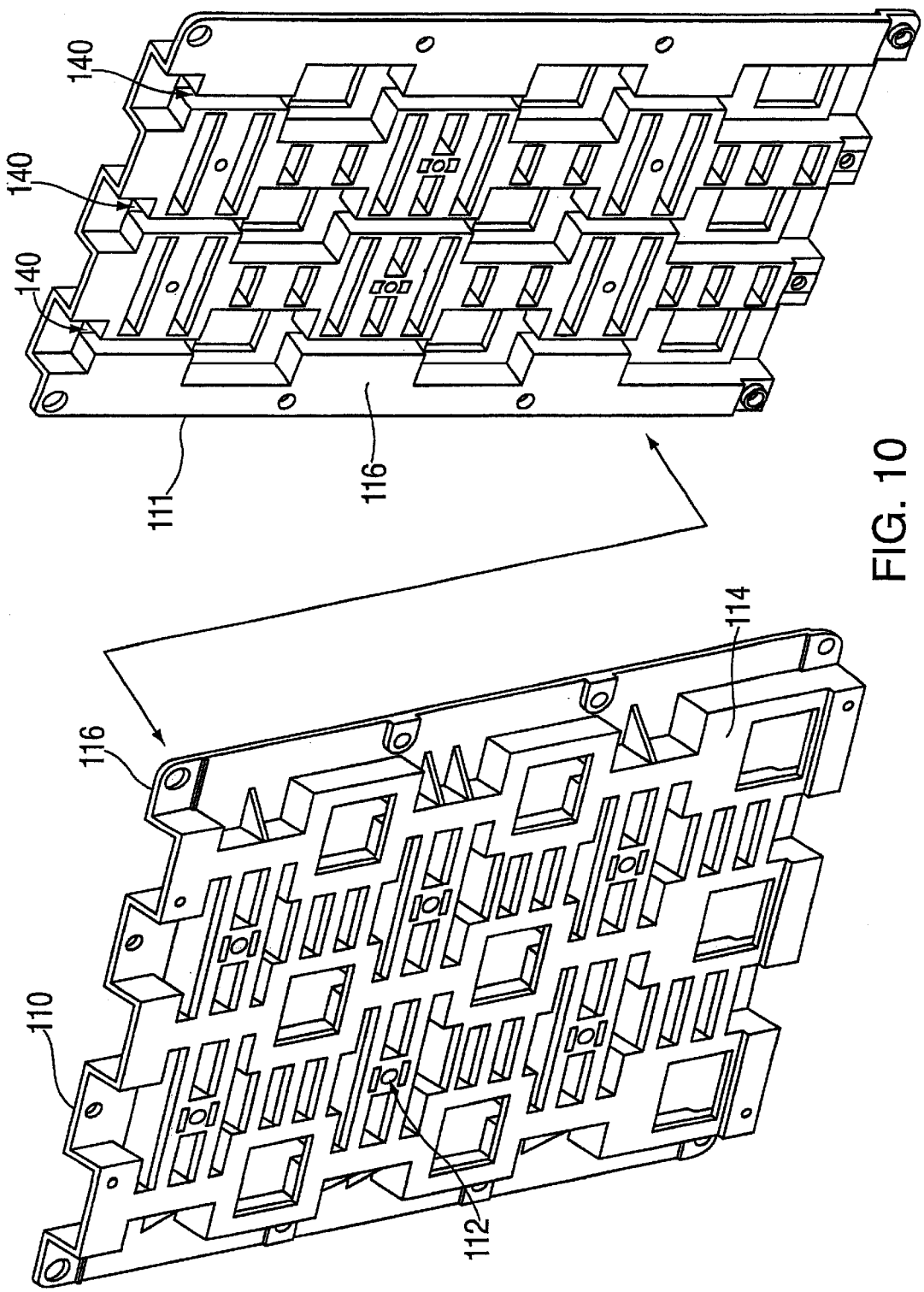
Figure 11:
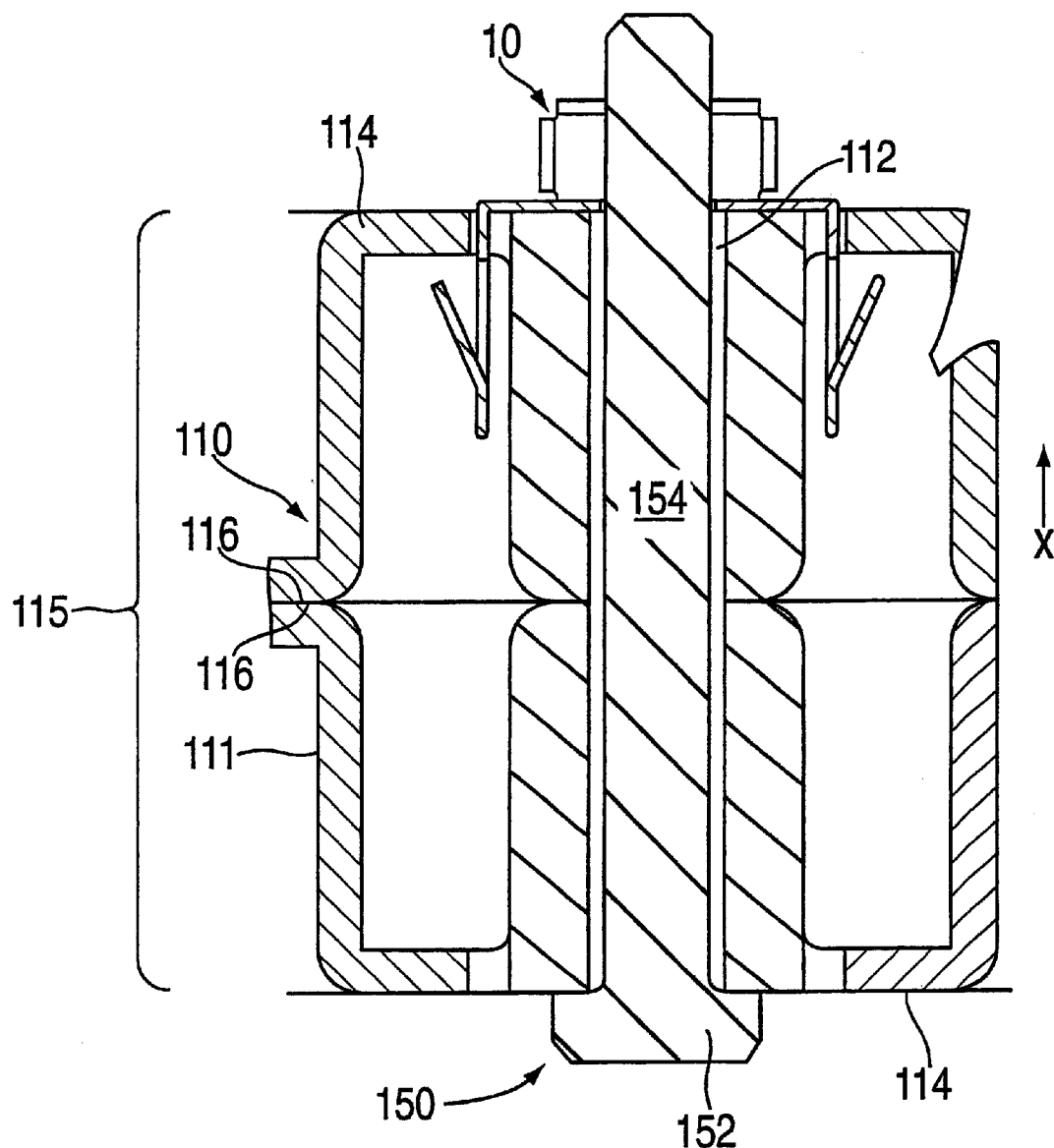
FIG. 11 is a side cross-sectional view of a pair of vertical bus barriers held together by a bolt and fastener of the present invention.

Preferably, three bus bars are attached to the horizontal bus, aligned with the vertical cavities in the back and front barrier (first and second barriers 110, 111). A barrier assembly 115 utilizes two bus barriers 110 and 111 as shown in FIG. 10. The fastener 10 is placed on a back or first barrier 110 as shown in FIG. 11. Then, a second, front barrier 111 is turned 180 degrees. That is, when looking at a rear exploded perspective view of the barriers 110 and 111 as shown in FIG. 11, surface 114 of barrier 110 is shown, with surface 116 behind, and for barrier 111, surface 116 is visible, with surface 114 behind. Both second surfaces 116 of the first barrier 110 and second barrier 111 are placed face to face in an abutting relationship. The bolt or screw 150 may then be passed through the screw hole 112 in the X direction from the first surface 114 of the barrier 111. Since this barrier 111 has no fastener 10 installed, the bolt or screw head 152 may lie flush against the surface 114 when bolted together. Then, the shaft 154 of the bolt or screw 150 may pass through screw bole 112 of the barrier 111 and then the barrier 110 and finally past the first surface 114 of the barrier 110 threading into fastener 10 on back of the rear barrier 110. The fastener of FIGS. 5–7 is shown in use in FIG. 9 and the fastener 10 of FIGS. 1–4 is shown in use in FIG. 11.

Figure 12:
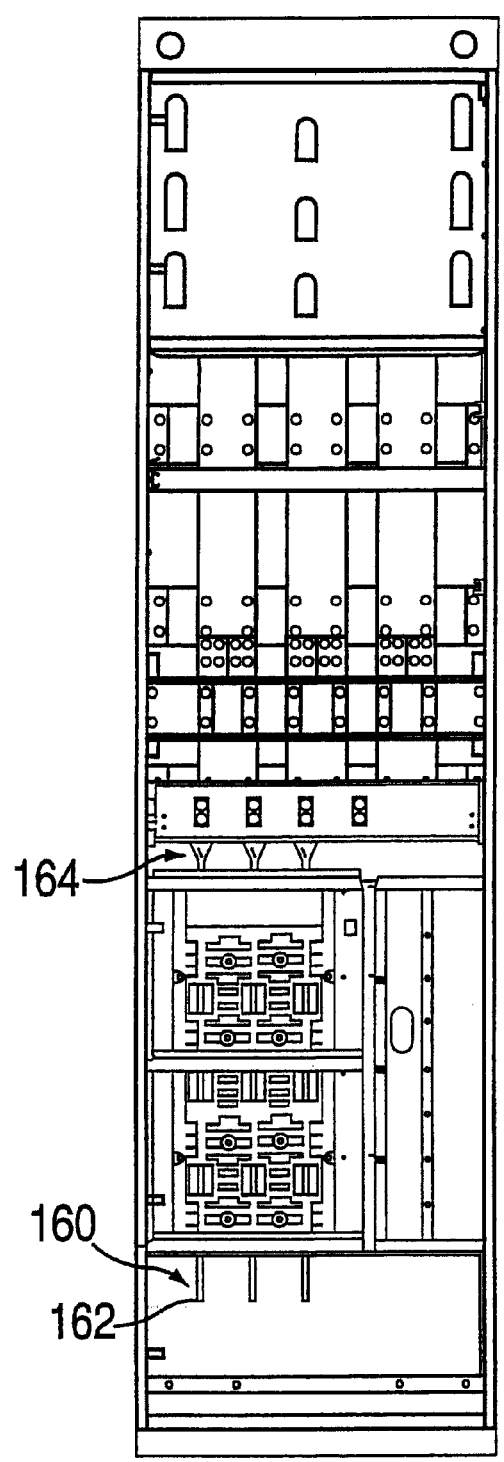
FIG. 12 is a front plan view of the vertical bus barrier of FIGS. 8–11 in use.
Figure 13:
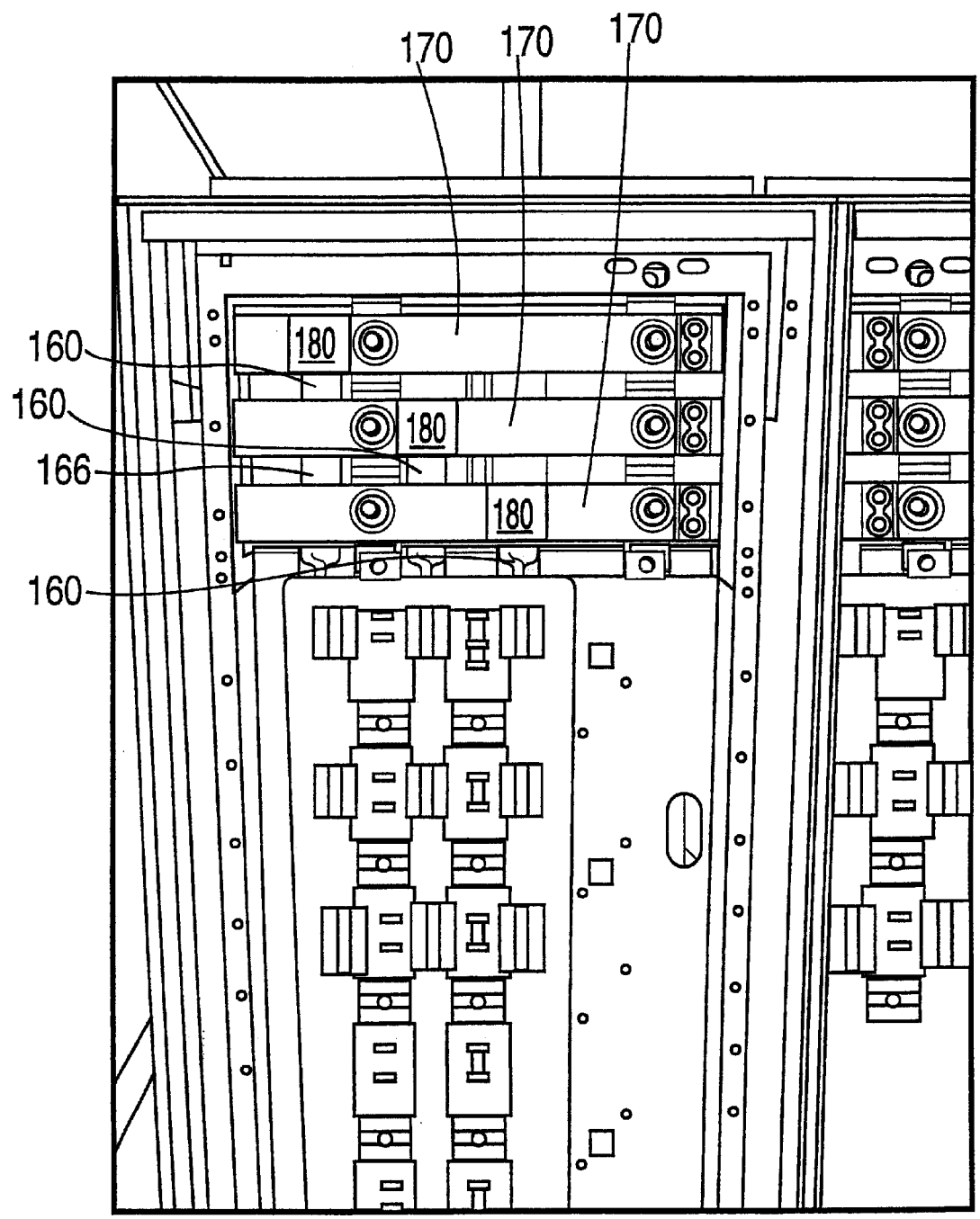
FIG. 13 is a front plan view showing horizontal and vertical bus bars with respect to the bus barriers of the present invention; and, FIG. 14 is a front plan view of a three section motor control line up.

Turning to FIG. 12, the vertical bus barriers 110 and 111 are used for sandwiching the vertical bus bars 160, three shown. The vertical bus bars 160 pass through the cavities 140 (see FIG. 10) that are formed within each barrier 110 and 111. The vertical bus bars 160 have a slim profile while passing through the barriers 110, 111 as shown at 162. That is, the thickness of the vertical bus bars 160 is shown at 162. Above the barriers 10 and 111, the vertical bus bars 160 have a 90 degree twist as shown at 164 about the centerline of each bus bar 160 such that a wider profile 166 (from a front plan view) is shown in FIG. 13. The wider profile 166, or width of the vertical bus bars 160, is used for connection to the flat horizontal bus bars 170. One vertical bus bar 160 is bolted to each horizontal bus bar 170 at connecting sections 180.

Figure 14:
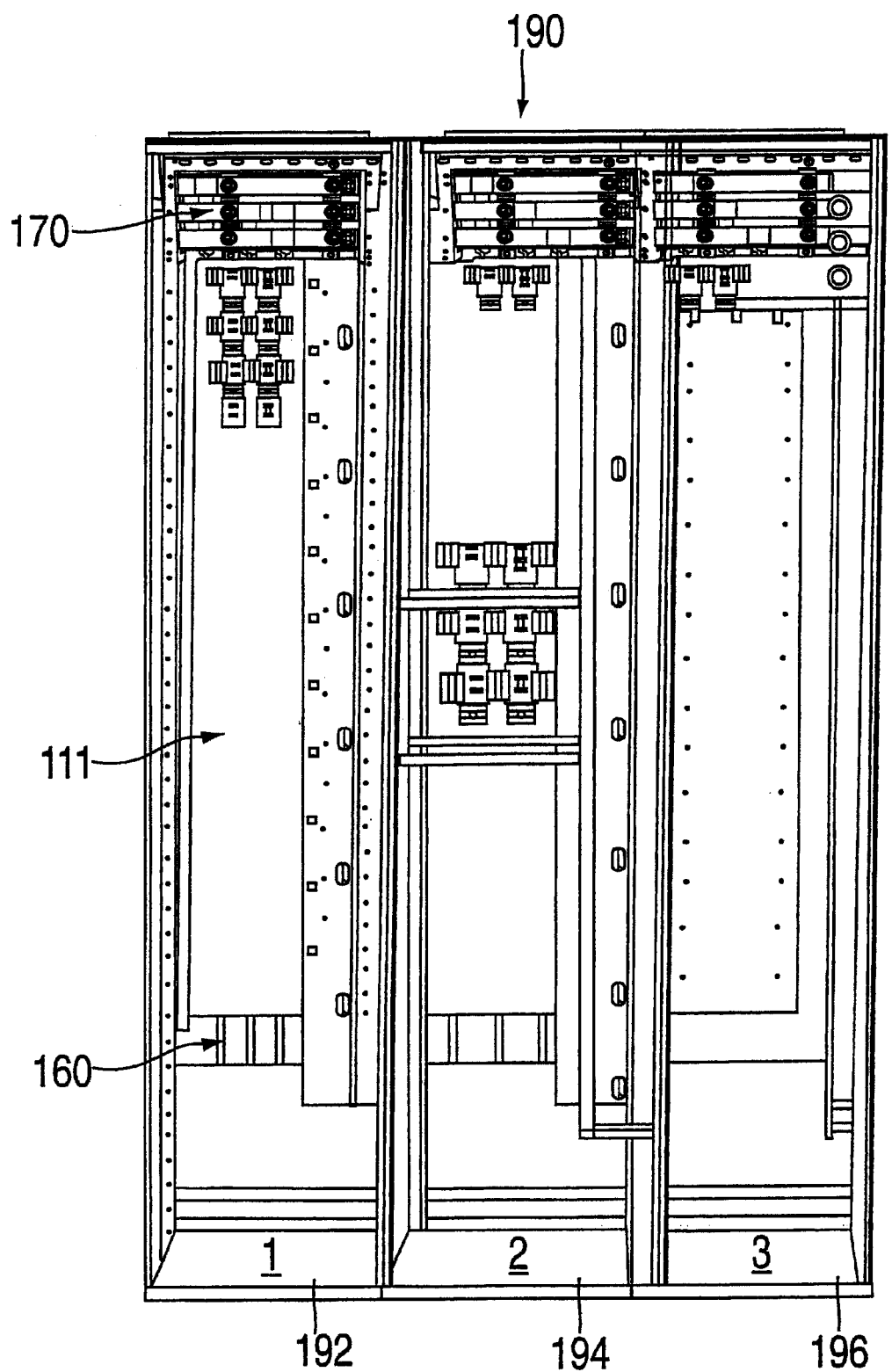

FIG. 14 shows a three section motor control line-up 190. Vertical bus 160 is shown only in sections 192 and 194, not in section 196. The horizontal bus bars 170, however, pass through all three sections. A bus barrier is installed in the front and back of each section.

The present invention eliminates the need for more expensive fasteners such as PEM brand self-clinching fasteners or molded inserts and nut & bolt combination requiring two assemblers. Using the snap in fastener 10 is cost effective, requires no assembly tools and allows front assembly of the vertical bus barriers in sections, using standard bolt type hardware. The caged nut design of the fastener shown in FIGS. 1–4 meets 2½ thread engagement and essentially eliminates the possibility of pull through during short circuit testing.

The barrier assembly 115 is held securely through use of the fastener and bolt/screw combination such that vertical bus 160 may be retained in insulated internal grooves 140, thus preventing the bus 160 from making contact with the other bus bars 160. As shown, the fastener 10 is suited for motor control vertical bus barriers of the 18" and 12" type, however, use on other types and sizes of vertical bus barriers as well as other applications are within the scope of this invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fastener for securing to a barrier, the fastener comprising:
   a main body portion having a first end and a second end, the main body portion further including a screw accepting aperture;
   a first leg depending from the first end of the main body portion;
   a second leg depending from the second end of the main body portion;
   the first leg and the second leg each having a mating end adjacent the main body portion and an unattached free end;
   a first barb on the first leg;
   a second barb on the second leg;
   the first barb and the second barb each formed as a cutout portion having an attached end adjacent the free end of each of said respective legs and angled outwardly from each of said respective legs; and,
   a nut holding cage extending from the main body portion.

2. The fastener of claim 1 further comprising a nut captively held within the nut holding cage, the nut having a screw hole aligned with the screw accepting aperture of the main body portion.

3. The fastener of claim 1 wherein the nut holding cage includes a first holding arm extending from a first side of the main body portion and a second holding arm extending from a second side of the main body portion.

4. The fastener of claim 3 wherein each of said first and second holding arms includes a side member, a pair of side flanges, and a top flange.

5. The fastener of claim 4 wherein each of said side flanges and said top flanges forms approximately a 90 degree angle with its respective side member and each side member forms an approximately 90 degree angle with the main body portion.

6. The fastener of claim 1 wherein each of said first and second barbs is spring biased to bend at an angle in the range of 5 to 45 degrees from its respective leg.

7. The fastener of claim 6 wherein each of said first and second barbs is spring biased to bend at an approximately 25 degree angle from its respective leg.

8. The fastener of claim 1 made from a sheet of heat treated spring steel.

9. The fastener of claim 1 wherein the fastener is integrally formed by stamping out a single sheet of material and bending the material to form the nut holding cage and each of said first and second legs and each of said first and second barbs.

10. The fastener of claim 1 wherein each of said first and second barbs is spring biased and able to bend at the attached end.

11. A pair of connected bus barriers comprising:
    a first barrier having a first screw hole flanked by a first slot and a second slot;
    a second barrier having a second screw hole;
    a fastener having a main body portion with a screw accepting aperture, a first leg, and a second leg; and,
    a retainer having a head and an elongated body;
    wherein the first and second legs of the fastener are positioned in the first and second slots of the first barrier and the screw accepting aperture of the fastener is generally aligned with the first screw hole of the first barrier, further wherein the elongated body of the retainer is positioned within the second screw hole of the second barrier, the first screw hole of the first barrier, and the screw accepting aperture of the fastener.

12. The pair of connected bus barriers of claim 11 wherein the head of the retainer is adjacent the second barrier.

13. The pair of connected bus barriers of claim 11 wherein the fastener further includes first and second barbs spring biased on the first and second legs, respectively, and the first and second slots each include an upper wall having an inner wall surface upon which the first and second barbs abut for retaining the fastener on the first barrier.

14. The pair of connected bus barriers of claim 11 wherein the fastener further comprises a nut holding cage and an entrapped nut with a nut screw hole, wherein the nut is sandwiched between the first and second barriers and the nut screw hole is generally aligned with the screw accepting aperture of the main body portion.

15. The pair of connected bus barriers of claim 11 wherein the main body portion includes a pair of thread engaging flanges each having an indented end forming the screw accepting aperture of the main body portion, the elongated body of the retainer having threads engaged with the pair of thread engaging flanges.

16. A method for securing a first barrier to a second barrier comprising:
    inserting first and second legs of a fastener into first and second slots in the first barrier, the first and second slots flanking a first screw hole in the first barrier;
    placing the second barrier in abutting relation to the first barrier;
    aligning a second screw hole in the second barrier with the first screw hole of the first barrier;
    passing an elongated body of a retainer through the second screw hole of the second barrier and then through the first screw hole of the first barrier;
    subsequently passing the elongated body of the retainer through an aperture in the fastener; and,
    abutting a head of the retainer with the second barrier.

17. The method of claim 16 wherein the step of inserting first and second legs of the fastener comprises compressing first and second spring biased barbs located on the first and second legs, respectively, and abutting the first and second barbs against inner wall surfaces of the first and second slots after the first and second barbs are returned to a biased position.

18. A fastener for securing to a barrier, the fastener comprising:

a main body portion having a first end and a second end
first and second thread engaging flanges extending from the main body portion;

a first leg depending from the first end of the main body portion;

a second leg depending from the second end of the main body portion;

the first leg and the second leg each having a mating end adjacent the main body portion and an unattached free end;

a first barb on the first leg;

a second barb on the second leg;

the first barb and the second barb each formed as a cutout portion having an attached end adjacent the free end of each of said respective legs and angled outwardly from each of said respective legs.

19. The fastener of claim 18 wherein each of said thread engaging flanges is formed as a cutout portion from the main body portion and wherein the thread engaging flanges have indented ends which together form a generally circular aperture in the main body portion.

20. The fastener of claim 18 wherein the first thread engaging flange has a first section extending angularly from the main body portion and a second section extending from the first section and generally parallel to the main body portion, the second thread engaging flange having a third section extending angularly from the main body portion and a fourth section extending from the third section and generally parallel to the main body portion.

21. The fastener of claim 20 wherein the first thread engaging flange and the second thread engaging flange have a substantially equal length, and wherein the fourth section is longer than the second section.

22. A fastener for securing to a barrier, the fastener comprising:

a main body portion having a first end and a second end a first leg depending from the first end of the main body portion;

a second leg depending from the second end of the main body portion;

the first leg and the second leg each having a mating end adjacent the main body portion and an unattached free end;

a first barb on the first leg;

a second barb on the second leg;

the first barb and the second barb each formed as a cutout portion having an attached end adjacent the free end of each of said respective legs and angled outwardly from each of said respective legs wherein each of said first and second barbs is spring biased to bend at an angle in the range of 5 to 45 degrees from its respective leg.

23. A fastener for securing to a barrier, the fastener comprising:

a main body portion having a first end and a second end a first leg depending from the first end of the main body portion;

a second leg depending from the second end of the main body portion;

the first leg and the second leg each having a mating end adjacent the main body portion and an unattached free end;

a first barb on the first leg;

a second barb on the second leg;

the first barb and the second barb each formed as a cutout portion having an attached end adjacent the free end of each of said respective legs and angled outwardly from each of said respective legs, wherein each of said first and second barbs is spring biased and able to bend at the attached end.

* * * * *